US008706305B2

(12) United States Patent
Jiang et al.

(10) Patent No.: US 8,706,305 B2
(45) Date of Patent: Apr. 22, 2014

(54) FEEDBACK CONTROL FOR SHAPE MEMORY ALLOY ACTUATORS

(75) Inventors: Xin Xiang Jiang, Saint-Bruno (CA); Darius Nikanpour, Brossard (CA)

(73) Assignee: Canadian Space Agency, Saint-Hubert, Quebec (CA)

( * ) Notice: Subject to any disclaimer, the term of this patent is extended or adjusted under 35 U.S.C. 154(b) by 742 days.

(21) Appl. No.: 12/867,933

(22) PCT Filed: Feb. 20, 2009

(86) PCT No.: PCT/CA2009/000199
§ 371 (c)(1),
(2), (4) Date: Aug. 17, 2010

(87) PCT Pub. No.: WO2009/103159
PCT Pub. Date: Aug. 27, 2009

(65) Prior Publication Data
US 2011/0004346 A1    Jan. 6, 2011

Related U.S. Application Data

(60) Provisional application No. 61/064,213, filed on Feb. 21, 2008.

(51) Int. Cl.
*G01M 13/00* (2006.01)
(52) U.S. Cl.
USPC .............................................. 700/275; 700/42
(58) Field of Classification Search
USPC ..................................................... 700/42, 275
See application file for complete search history.

(56) References Cited

U.S. PATENT DOCUMENTS

| 3,665,756 | A | * | 5/1972 | Russell ........................ 73/766 |
| 4,884,557 | A | | 12/1989 | Takehana et al. |
| 6,410,886 | B1 | | 6/2002 | Julien |
| 6,516,146 | B1 | | 2/2003 | Kosaka |
| 6,543,224 | B1 | | 4/2003 | Barooah |
| 6,574,958 | B1 | | 6/2003 | MacGregor |
| 6,686,564 | B2 | | 2/2004 | Zhou |
| 6,969,920 | B1 | | 11/2005 | Severinghaus |
| 6,981,374 | B2 | | 1/2006 | von Behrens et al. |

(Continued)

FOREIGN PATENT DOCUMENTS

| CN | 10112259 | 2/2008 |
| JP | 57136139 | 8/1982 |

(Continued)

OTHER PUBLICATIONS

Brinson et al., "Deformation of Shape Memory Alloys Due to Thermo-Induced Transformation", J. of Intel. Mat. Systems and Structures, vol. 7, p. 97-107, 1996.
Cho et al., "Segmented Binary Control of Multi-Axis SMA . . . ", Smart Structures and Materials: Signal Processing and Control, Proceedings of SPIE, vol. 5757, p. 314-322, 2005.
Ikuta et al., "Mathematical Model and Experimental Verification of Shape Memory Alloy for Designing . . . ", Proceedings, IEEE Micro Electro Mechanical Systems, p. 103-108, 1991.

(Continued)

*Primary Examiner* — Carlos Ortiz Rodriguez
(74) *Attorney, Agent, or Firm* — Jason Davis

(57) ABSTRACT

Control feedback for regulating strain output of a shape memory alloy (SMA) actuator using a stress sensor for outputting an indication of a mechanical resistance applied against the SMA actuator, and a state sensor for outputting an indication of a state of actuation of the SMA actuator has been found to be surprisingly accurate. Advantageously feedback detection can be provided with sensors that have low power requirements and can be controlled with simple electronics.

20 Claims, 7 Drawing Sheets

(56) References Cited

U.S. PATENT DOCUMENTS

| | | | |
|---|---|---|---|
| 7,363,821 | B2 | 4/2008 | Black et al. |
| 2004/0261411 | A1 | 12/2004 | MacGregor |
| 2007/0175213 | A1 | 8/2007 | Featherstone et al. |
| 2009/0099551 | A1* | 4/2009 | Tung et al. ............ 604/530 |
| 2012/0018413 | A1 | 1/2012 | Pilch et al. |

FOREIGN PATENT DOCUMENTS

| | | |
|---|---|---|
| JP | 60142409 | 7/1985 |
| JP | 1118739 | 5/1989 |
| JP | 2311739 | 12/1990 |
| JP | 3183930 | 8/1991 |
| JP | 3202747 | 9/1991 |
| JP | 4118542 | 4/1992 |
| JP | 05248341 | 9/1993 |
| JP | 7084646 | 3/1995 |
| JP | 2001099770 | 4/2001 |
| JP | 2001142105 | 5/2001 |
| JP | 2006183564 | 7/2006 |
| KR | 106677053 | 5/2006 |
| WO | 2005075823 | 8/2005 |

OTHER PUBLICATIONS

Jiang et al., "Stability of Cyclic Strain Output of Ni-Ti Shape Memory Alloy (SMA) Actuator Under . . . ", Proceedings of 16th International Conference . . . , p. 360-367, 2005.

Kato et al., "A One-Dimensional Modeling of Constrained Shape Memory Effect", Acta Materialia, vol. 52, p. 3375-3382, 2004.

Nascimento et al., "Electro-Thermomechanical Characterization of Ti-Ni Shape Memory Alloy Thin Wires", Materials Research, vol. 9(1), p. 15-19, 2006.

Prahlad et al., "Comparitive Evaluation of Shape Memory Alloy Constitutive Models with Experimental Data", J. of Intel. Mat. Systems and Structures, vol. 12, p. 383-395, 2001.

Savi et al., "Phenomenological Modeling and Numerical Simulation of Shape Memory Alloys . . . ", J. of Intel. Mat. Systems and Structures, vol. 13, p. 261-273, 2002.

Song et al., "Control of Shape Memory Actuator Using Pulse Width Modulation", Smart Materials and Structures, vol. 12, p. 712-719, 2003.

Song et al., "Precision Tracking Control of Shape Memory Alloy Actuators Using Neural Networks . . . ", Smart Materials and Structures, vol. 12(2), p. 223-231, 2003.

* cited by examiner

FEEDBACK CONTROL FOR SHAPE MEMORY ALLOY ACTUATORS

CROSS-REFERENCE TO RELATED APPLICATIONS

The present application is related to U.S. provisional patent application Ser. No. 61/064,213, filed Feb. 21, 2008.

The present application is a national entry of International Patent Application PCT/CA2009/000199 filed Feb. 20, 2009 and is related to U.S. provisional patent application Ser. No. 61/064,213, filed Feb. 21, 2008.

FIELD OF THE INVENTION

This invention relates in general to regulation of strain output of a shape memory alloy (SMA) actuator, and in particular to a feedback control mechanism for precise control over strain output of SMA actuators.

BACKGROUND OF THE INVENTION

Shape memory alloys (SMAs), typically but not limited to Ni—Ti alloy, possess unique characteristics that permit them to generate a large strain output and force. The SMAs are also flexible in nature permitting high pseudoelasticity. It can easily operate as an On/Off type actuator, and it has found some applications in various fields ranging from medical, to industry, and to aerospace. Wider application of SMAs in these and other fields has been proposed, in such fields as space and aerospace, precise mechanical or optical systems, and in robotics, but this wider application has been so far limited due to the difficulty in achieving a precise strain output regulation. This is primarily because the SMA mechanism is intrinsically thermo-activated through so-called Martensite to Austenite phase transformation. The correlation between the strain output of SMA and its temperature, which holds the key for strain output regulation, is found to be highly nonlinear. Hysteresis is a significant problem. It is not known what factors affect the local temperature at a given point in the SMA, and to what extend these factors are relevant, although it has been suggested that phase state, loading stress, and fatigue cycles, may be relevant.

A first known method of strain output regulation is based on a thermomechanical model. For this method, a thermomechanical model of the SMA must first be established, and then given a model strain output regulation can be computed for a given thermal state. For example, see Ikuta, K., M. Tsukamoto, S. Hirose. "Mathematical Model and Experimental Verification of Shape Memory Alloy for Designing Micro Actuator", Proceedings, IEEE Micro Electro Mechanical Systems, New Jersey, pp. 103-108, 1991, and Prahlad, H., I. Chopra. "Comparative Evaluation of Shape Memory Alloy Constitutive Models with Experimental Data", Journal of Intelligent Material Systems and Structures: Vol. 12, pp. 383-395, June 2001. The accurate modeling of strain output permits the definition of algorithms for strain output regulation.

The first method suffers several drawbacks: (1) the model parameters typically are determined experimentally (or are not accurate) because they depend on the specific type of SMA actuator (alloy composition and heat-treatment) and on the external thermal environmental parameters; (2) there has not been a widely applicable model developed that permits generalization to different situations; and (3) control schemes based on such thermomechanical models are very complex due to the need to deal with SMA's inherent hysteresis with minor loops. Because of these challenges, the method is more of a theoretical research tool than a practical method for controlling SMA actuators.

A second method is a more typical feedback control of a SMA's strain output using a position sensor. Typically a high accuracy position sensor, such as a linear variable differential transformer (LVDT) or an optical encoder is used to provide strain feedback to a controller. Although it has proven strain output control precision, it requires dedicated position sensors and sophisticated power supply hardware with signal amplification functions in order to provide the feedback. The power supply requirements makes the SMA actuator control system bulky. For example the requirement for the position sensor, which has to be placed somehow at the moving end of SMA actuator, has been the major constraint on the design and the use of SMA in a number of potential applications. Such applications include space and aerospace systems, where there are very stringent requirements for the mass, volume and design simplicity. This is particularly challenging if multiple SMA actuators need to be used, for multiple actuation states, etc.

A third known method is a multi-step strain output control of segmented SMA actuators [8]. Such methods required a compound SMA actuator having of a number of SMA segments and each segment can be turned on or off individually (binary control) so as to achieve a multistep strain output regulation for the integrated actuator. This method also presents drawbacks which include: (1) it permits only stepwise rather than continuous strain output regulation, and the size of the steps is limited by the number of segments; and (2) because the SMA is intrinsically thermo-activated, when one SMA segment is activated through electrical heating, heating will typically spread to neighboring segments, which can cause partial activation of those segments, thus resulting in relatively poor strain output regulation precision. While smaller segments are subject to less hysterisis than larger volumes, they are also more sensitive to temperature changes, such as those induced from neighbouring segments. The addition of insulation between the segments slows down the cooling thermal response of the segments, and also limits the coupling of the mechanical actuation of the segments together resulting in a more failure prone and complicated actuator.

It is noted that this third method defers the problem to statistics rather than addressing it. The control of the segments is exactly the same problem as the whole before, but the number of segments changes the system to a distributed control architecture which has advantages and drawbacks.

An article by Maria Marony Sousa Farias Nascimento et al. of the Department of Electrical Engineering, Universidade Federal de Campina Grade, Brazil, entitled "Electro-thermomechanical characterization of Ti—Ni shape memory thin wires", teaches measurement of hysteretic strain—temperature and resistance—temperature characteristic curves to determine shape memory parameters, like martensitic transformation temperatures, temperature hysteresis, temperature slopes and shape memory effect under load. While the article does compute a compound hysterisis graph from these two, there is no teaching or suggestion of what parameters are necessary or sufficient to produce precise strain output regulation of a SMA. The hysteretic characterization is one problem that is shown to vary with actuators and setups.

The specific test apparatus disclosed in the article uses a transistor in the design of a voltage/current converter, along with an amplifier and reference resistor to constitute the whole power regulator, which is able to convert a triangle waveform of voltage signal to the exact waveform of current signal to meet the need of SMA characterization experiment. The combined use of amplifier and transistor in that case is believed to compensate the foreseeable current fluctuation upon the voltage signal (because the resistance of SMA changes as it is being heated) so that the current waveform can be exactly the same as the voltage signal waveform. This also explains why it is called the "voltage/current convert".

WO 2005/075823 to Featherstone et al. teaches a controller for a SMA actuator that includes an electric power source for applying an electric current through an SMA element, a sensor to detect change in an electric resistance of the element; and a regulator for controlling the magnitude of the applied electric current. Unfortunately this teaches a regulator that is bulky, an expensive as noted above. The idea of supply different current when maintaining actuation and when switching actuation is taught.

It is known in the field of SMA heaters that control of a Nitinol heater can be effected using temperature data feedback from a separate temperature sensor such as a thermocouple, or using the resistance within a heater element itself as a temperature sensor, since the resistance of the Nitinol changes with temperature in a predictable way. See U.S. Pat. No. 6,410,886 to Julien. To within the sensitivity requirements of a space heater (not very high), when there is an assumption of no loading stress, the resistance can be used to estimate the temperature so as to estimate the state of SMA heating element. The hysterisis of the heater would be significantly greater than that of the Nitinol elements. No specific temperature and resistance correlation is plotted, and this would be a basic requirement for high precision control feedback. Julien teaches little of practical use for applications of precision control feedback systems. It is inferable from Julien that an ohm meter is used for determining resistance, and thus a device with a dedicated power supply would be integrated into their system.

There is a need for a SMA strain output regulation technique that provides high precision control over the SMA, especially for SMA actuators that encounter variable mechanical resistance during actuation. The need is especially felt for a strain output regulating feedback technique that does not rely on sensors requiring externally driven modulated power sources to operate. Finally, a feedback design for controlling SMA actuators is provided.

SUMMARY OF THE INVENTION

Applicant has found that surpisingly good quality feedback control of SMA actuators is possible using feedback from a state sensor, and a force sensor.

In accordance with an aspect of this invention, a control feedback mechanism for regulating strain output of a shape memory alloy (SMA) actuator is provided, the control feedback mechanism comprising:
  a. a stress sensor for outputting an indication of a force on the SMA actuator;
  b. a state sensor for outputting an indication of a state of actuation of the SMA actuator; and
  c. an actuation signal for selectively heating a SMA element of the SMA actuator in dependence on a desired state of actuation, and the indications of mechanical resistance and state of actuation.

The control feedback mechanism may further comprise a control processor, such as a data acquisition board (DAQ) and a general purpose computer, wherein the actuation signal for selectively heating the SMA element is a voltage-modulated electrical signal from the control processor for controlling a circuit to selectively deliver power for direct electrical resistive heating of the SMA element.

The sensor for outputting an indication of a state of actuation may comprise circuit elements of the circuit for outputting an electrical resistance across the SMA element to the control processor, and the stress sensor may comprise a strain guage for computing a load on the SMA element. The strain guage may be supplied power from the circuit for selectively delivering power for heating the SMA element or another power source. The control feedback mechanism may use a single direct current (DC) power source.

The SMA actuator may be of a contraction-type having a SMA element in the form of a wire, ribbon, rod, strip or tube, or an assembly of one or more of the above, such as those made of or based on NiTi alloys.

The actuation signal may control a switch in the circuit for selectively applying heat by direct electric resistive heating of the SMA element. The circuit may comprise a first resistor connected in series with the SMA element, and the switch for selectively closing the circuit in response to a signal from the control processor to apply a controlled current through the SMA element. The switch may be a first transistor, and the circuit further comprises a bypass resistor connected in parallel to the first transistor and in series with the first resistor forming a first circuit branch between the first resistor and the first transistor to the ground, the bypass resistor being of a resistance selected to bypass the first transistor when the transistor is off while providing sufficient electrical power to allow an electrical resistance measurement of the SMA element, while applying a minimum of heat to the SMA element, such as a resistance of at least 10 times the combined resistance value of the first resistor and a maximum resistance of the SMA element.

The control feedback mechanism wherein the control processor is adapted to determine the actuation signal, for example using an algorithm or a lookup table, in dependence on:
  d. a desired actuation level, and
  e. the indicators of a state of actuation, and the mechanical resistance, and optionally one or more of:
  f. a hysterisis function that depends on previously sent actuation signals;
  g. a modeled thermodynamic state of the SMA environment;
  h. a measurement of the thermodynamic state of the SMA environment; and
  i. an operating mode of the SMA actuator.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Herein a method and apparatus are provided for precision control of a SMA actuator.

Figure 1:
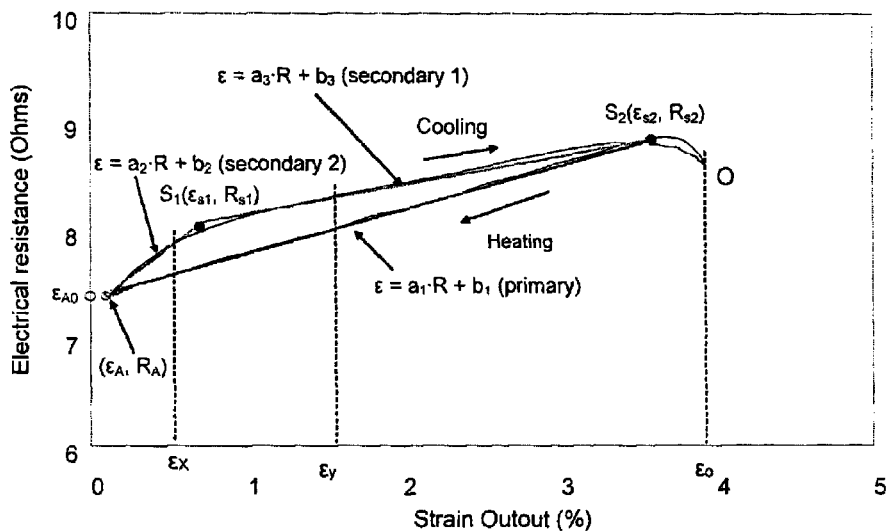
FIG. 1 is a graph relating strain output and electrical resistance of a known SMA actuator.

FIG. 1 is a graph showing a typical actuation of a SMA actuator that is known in the art. The SMA actuator used to produce this graph is a Ni—Ti SMA actuator supplied by Dynalloy Inc. USA. This is a typical example of contraction-type SMA actuators, and it consists of an SMA element in the form of a wire. The SMA actuator is designed for electronic coupling so that a current can be applied across the length of the SMA wire to apply heat to the SMA wire, to actuate it, and cause contraction. The heat applied is produced by resistance to the current through the SMA wire, in accordance with resistive heating, as is well known in the art. Naturally environmental controls are provided to ensure that the heat applied to actuate the SMA wire is dissipated within a desired response time. As previously mentioned, the relationship between temperature of a SMA and its state of deformation (strain output) is a complex, non-linear one.

In FIG. 1, the horizontal axis shows the strain output as a percent deformation. More specifically, the strain output is a value relative to complete contraction ($\epsilon_A$), and thus a % elongation is provided on the x axis, as applied in response to a reduction in current. Complete contraction ($\epsilon_A$, $R_A$) is a state that is chosen according to the margin of safety of the SMA wire—a maximum working temperature of the SMA wire is chosen to avoid irreversible damage to the SMA wire—in which substantially the whole SMA wire is in the Austenite phase. There is no external load applied to the SMA actuator in the $\epsilon_{AO}$ state, and all of the other states shown: those on the cycle, are subject to a same load.

The opposite state is one of (relatively) complete relaxation $S_2(\epsilon_{s2}, R_{s2})$ of the SMA actuator. In the experiment performed here, the SMA wire elongates about 3.5% when going from the completely contracted state to the completely relaxed state. It is generally noted that the hotter the SMA, the more Austenite phase is present, and the higher the electrical resistivity of the SMA, but that the resistance varies by less than 1.5 ohms.

Because of the phase change undergone by the SMA wire, the thermal and electrical properties of the SMA wire change throughout the cycle. The heat dissipation rates and the lag caused by a nominal latent heat at the phase transistion, result in different heating and cooling paths for the material as shown in the graph. The heating path is substantially linear, and is given substantially as the line connecting the complete contraction and complete relaxation points. The cooling path is significantly less linear. It is marked by a significantly faster rise in resistance during a first period, followed by a more gradual rise in resistance until the temperature cools to the complete relaxation point. These two periods are somewhat piece-wise linear, given by the equations presented on the graph. Accordingly, three linear functions may be used to express the correlation between the strain and electrical resistance of SMA. $S_1$ and $S_2$ are the transition points for transfer between different linear functions governing the cooling path of the SMA actuator.

Figure 2:
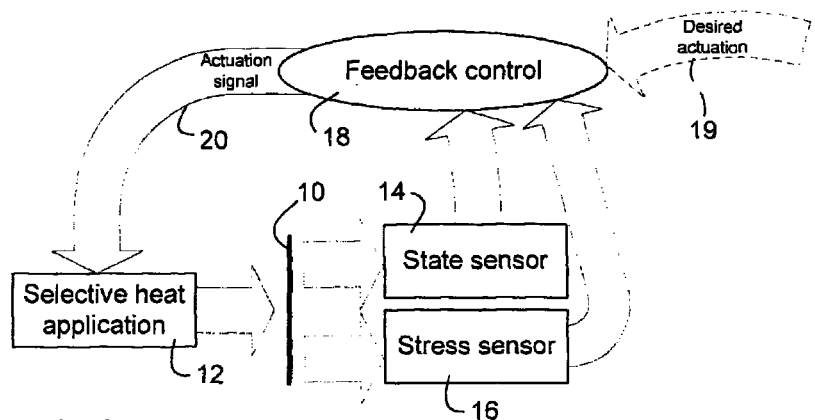
FIG. 2 is a schematic illustration of a feedback loop for precision control of a SMA actuator, and specifically providing load factored feedback control in accordance with the invention.

FIG. 2 schematically illustrates a control feedback mechanism in accordance with an embodiment of the invention, that incorporates strain feedback. A contraction-type shape memory alloy (SMA) actuator having a ribbon, wire, rod, cylinder SMA element 10 is adapted to be controlled by the selective application of heat 12 with the SMA element 10 in an environment that cools the SMA element 10 quickly enough to provide a desired control response time. The SMA actuator can have an SMA element composed of a Ni—Ti alloy, or a Ni—Ti—Cu alloy, or any other suitable SMA actuator. The selective application of heat 12 may be provided using any currently known or later proposed methods, provided they produce heating at a desired rate without damaging the SMA element 10. While this application of heat 12 is preferably by electric resistive heating by direct application of current through the SMA element 10, in other embodiments, electric resistive heating of a medium in which the SMA element 10 is placed, or other resistive masses in the neighbourhood of the SMA element 10, or laser, ultrasonic, or eddy current heating, of the SMA element 10, the medium or other masses, could be used. Furthermore movement of the actuator with respect to an extreme thermal gradient field could effectively produce the same result of controlling a temperature of the SMA element 10.

The SMA element 10 is monitored in two respects: for a state of actuation, and a load on the SMA element 10. The load on the SMA element 10 has been found to change the temperature—strain output relation of SMA elements. Surprisingly, in spite of the complexity of the actuation and the possibility of many other factors being relevant, a high precision control feedback loop has been demonstrated using only feedback from the SMA element 10 in the form of an indicator of a state of actuation of the SMA actuator, and an indicator of a load on the SMA actuator. As such, a stress sensor 14 and a state sensor 16 are provided.

The stress sensor 14 can, in principle, be provided by the computation of a force applied on the SMA element 10, for example, from sensed knowledge of, or a computed model of that which applies the stress on the SMA actuator. However, in many applications, direct measurement of the stress applied to the SMA actuator in the direction opposing motion of the actuator, is preferable. As will be understood, determining the stress can be performed in a number of ways. In general, it is convenient to measure the stress in terms of strain or deformation, which are related by Young's modulus of a reliable material. Thus commonly known strain gauges can be used as the stress sensor. Advantageously some of these are compact, light weight, and/or are controlled with minimal electronics as may be desired. Typically it is preferred to measure strain locally, as close to the SMA element 10 as possible, so that flexure of intervening material does not interfere with the reading. Naturally, by using much less compliant materials between the SMA element 10 and the stress sensor 14, this flexure can be minimized, and thus the strain may be measured less locally, as some applications may require. Optical strain gauges could also be used, such as a fiber Bragg grating sensors.

One advantage of using direct electric resistance as the selective application of heat 12 is that while current flows across the SMA actuator, it is possible to directly determine a resistance across the SMA in myriad of ways known in the art. Changes in resistance are then attributable to changes in the state of the SMA actuator, as shown in FIG. 1. Therefore one embodiment of a state sensor 16 includes electronic circuit elements for outputting a signal that vary with the resistance across the SMA element 10. The signal output by the state sensor 16 may be in the form of voltage-modulated electrical signals that may be compared using known analog circuit elements and/or a digital processor to produce an analog or digital signal representing the resistance across the SMA element 10, or local electronics may be used to output a derived value.

Alternatively thermal detection of the state is possible. For example, a thermocouple could be used for direct detection of the state of the SMA element 10. Desire for a short response time for accurately determining a temperature that adequately reflects the temperature of the whole SMA element 10, would suggest that the thermocouple should be intimately coupled with the SMA element 10, but it is generally important for the state sensor not to impede actuation of the SMA element 10. Low viscosity, high thermal conductivity fluids may be used to surround the SMA element 10 to facilitate the measurement, or a small gap separation of the thermocouple may be used.

The feedback from the state sensor 16 and stress sensor 14 are received by a feedback control 18 to produce an actuation signal 20 for controlling the selective application of heat 12. Some applications may require a SMA actuator to continuously apply a prescribed pressure on a supported element, or to retain the actuator in a given state of actuation in the face of changing environmental or mechanical conditions. If so, this feedback mechanism is satisfactory. Analog circuitry for combining the inputs from the two sensors may be used to continuously derive the actuation signal 20, which may be a current-modulated electrical signal to the SMA element 10 to directly control electric resistive heating, for example. By providing both the state of actuation and the load on the SMA element 10, a response function can be determined that will effect a desired response.

In many applications, an indication of the desired actuation 19 comes from elsewhere. For example, a user interface, a command derived from a user interface, or a control program may provide an indication of a desired actuation 19, or change therein. The desired actuation 19 may be an analog signal provided directly by a user input, which can be compared with the state and stress sensor feedback to derive a suitable actuation signal. Alternatively the feedback control may be provided by a digital processor which may receive the feedback in analog or digital format and compute the actuation signal required for effecting the desired actuation.

Figure 3A:
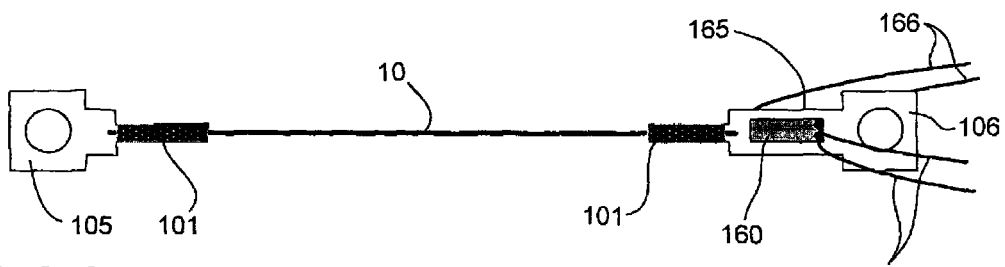
FIG. 3a is a schematic illustration of a stress sensor for an SMA actuator with a thermocouple for temperature compensation, in accordance with an embodiment the invention.

FIG. 3a is a schematic illustration of the SMA actuator with an embedded stress sensor in accordance with an embodiment of the invention. The SMA element 10 is mechanically secured at an anchoring end to a support frame, and at an opposite end to a small displacement slider, which may be mechanically coupled to other simple machines to effect a desired motion of a desired piece. It may be irrelevant which side of the SMA element 10 the stress sensor is mounted, for example if the SMA element 10 is stiffer than the piece upon which the stress sensor is mounted, in which case the strain would be concentrated at this piece. It will be appreciated that a trade-off between providing an accurate assessment of the strain and the maximum force applied by the SMA actuator must be provided in this embodiment.

In the illustrated embodiment, the SMA element 10 is secured to couplers 105 and 106 at opposite ends, by respective crimps 101. The couplers 105 and 106 have threaded through bores for mechanical attachment to the small displacement slider or support frame. Coupler 106 is different from coupler 105 in that it has an extended section that is of a composition, thickness, and/or position to be favourably strained by a load applied to the SMA element 10. As noted above, in other embodiments the strain sensor may be located at a position less proximate the SMA element 10.

The stress sensor is in the form of a strain guage 160 mounted on the extended section. Knowing the Young's modulus of the extended section, and the area of its cross-section, the force applied on the SMA wire can be calculated based on reading (elastic deformation of the flat section) of from the strain gauge. The stress sensor illustrated is a foil-type strain guage that operates on the principle of electrical resistance varying with length and cross-sectional area of a conductor, as are commonly available, small, and sensitive enough for the present application. Advantageously they are selectively sensitive to strain in one direction, and naturally the orientation of the strain guage 160 is in the direction of contraction and extension of the SMA element 10. The strain guage 160 is electrically connected by conductors 162 for supplying electricity to, and for outputting temperature data from, the strain guage 160, via a quarter-bridge circuit. Some foil-type strain gauges are sensitive to thermal variations as a change in temperature of the conductor cause corresponding thermal contraction and expansion, which would otherwise be detected as strain. Several solutions for the temperature dependence are known and can be applied in various applications.

The illustrated embodiment provides a thermocouple 165 (not in view) on an opposite side of the extended section of the coupler 106. The thermocouple 165 is electrically connected by conductors 166 for supplying electricity to, and for outputting temperature data from, the thermocouple 165.

In the embodiment of FIG. 3a, direct electric resistance heating may be provided by connecting a circuit to the conductive crimps 101, or the circuit may pass through the couplers 105, and 106.

Figure 3B:
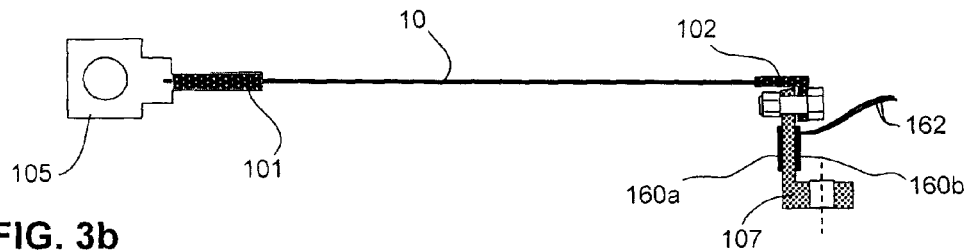
FIG. 3b is a schematic illustration of a stress sensor for an SMA actuator consisting of a pair of strain gauges in a self temperature regulating arrangement, in accordance with an embodiment the invention.

FIG. 3b is a schematic illustration of an alternative embodiment for the stress sensor. Like features are identified with like reference numerals and their descriptions are not repeated here. The principle difference between the embodiments of FIGS. 3a and 3b is an off-axis support for one end, which results in a shearing force applied at a rigid section running substantially perpendicular to the SMA element 10. In the specific drawing, this is provided with a crimp head bent 90° and rigidly secured to a coupler 107 (by a bolt). An elongated section between the bolt and a through bore for coupling with the support structure or small displacement slider provides the place for determining strain. Knowing a stiffness of the cantilevering section of coupler 107 and its bending strain, the force applied to its end can be calculated. By using two strain gauges 160a,b (each connected by conductors 162a,b) on opposite sides of the elongated section, compressive strain will tend to register a compression on the near strain gauge 160a, and an expansive strain on the far strain gauge 160b. An change in temperature of the two strain gauges 160a,b will tend to cause both to expand or contract, but a difference between the strain readings of these two strain gauges 160a,b will be self regulating with respect to temperature. Preferably the two strain gauges 160a,b are connected in a half bridge configuration to simplify output.

The coupler 107 may further be made of a thermally insulating material such as plastic to limit the temperature fluctuations of the strain gauges 160a,b. The contacts for direct electric resistance heating of the SMA element 10 may be provided via the crimps, for example.

The advantage of this construction is the plastic arm can effectively isolate the heat transfer from the SMA actuator to the strain gauge so as to minimize the influence of temperature on the strain reading of cantilever arm. Two strain gauges, one on the right (tension) and one on the left (compression), can effectively provide self-temperature compensation.

Figure 4A:
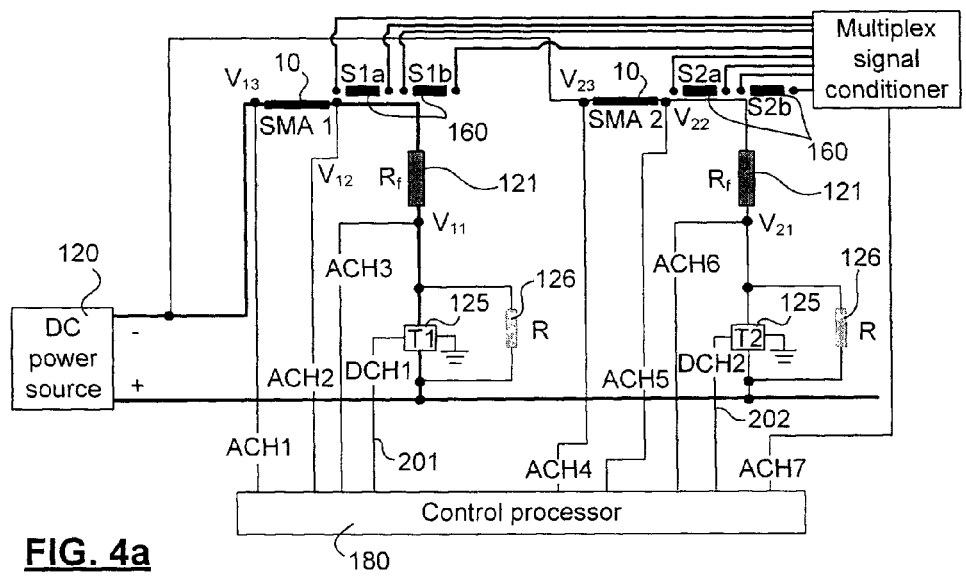
FIG. 4a is a schematic illustration of a circuit providing two resistance controlled SMA actuators each with a stress sensor and a state sensor, in accordance with an embodiment of the invention, wherein the stress sensors have separate power supply and signaling.

FIG. 4a is a schematic illustration of a circuit for effecting feedback control of a pair of SMA actuators in accordance with an embodiment of the invention. While two SMA actuators are shown, it will be appreciated that other numbers of SMA actuators could equally be embodied in an enlarged circuit by replication of the circuit patterns shown here.

FIG. 4a shows two SMA elements 10 (SMA1 and SMA2), which appear collinear and distant, but it will be appreciated that they could have any desired spatial arrangement, subject to the limitations of independent electrical coupling and a desired thermal coupling. The SMA elements 10 are both in parallel branches of a circuit. Each branch is effectively a serial connection of a DC power source 120, a reference resistor 121 ($R_f$), and a switch. The DC power source 120 can be a direct power unit, a battery, or any other suitable direct current power source.

The function of the switch is to selectively actuate the circuit for supplying current to the respective SMA element 10 to control direct electric resistive heating. It will be appreciated by those of skill in the electronic arts that there are several circuit means for accomplishing this, and that some may be preferred in certain applications. There may be value in providing a plurality of currents to the SMA element 10, for providing a continuously varying range of currents, for simplicity of design, or for providing response to certain control signals in different embodiments.

The design illustrated, preferred for its simplicity uses a transistor to effectively eliminate the need for a sophisticated power supply unit adapted for signal amplification, which is generally regarded as necessary for feedback position control of SMA actuators. This significantly simplifies the requirement for the hardware, reducing the mass and volume and providing great simplicity in the design and operation of SMA actuator, particularly when the strain output regulation of multiple SMA actuators is required.

However, the use of a transistor poses a technical challenge if continuous measurement of electrical resistance across the SMA element 10 is desired. If intermittent (regular or sporadic) sampling of the state of the SMA element 10 is satisfactory, and actuation for a period of time that is sufficient to provide a reliable reading of the state does not generally apply enough heat to significantly alter the state of the SMA element 10, it may be preferred to simply provide a transistor.

However, it is generally desired to provide a fast acting switch that changes states within the shortest duration, which requires that the SMA element 10 draw as much power in the measurement interval as it can safely absorb and dissipate. Accordingly, it may be preferable to provide continuous monitoring of the state of the SMA element 10. This may be provided by permitting some minimal electrical current to pass through the SMA actuator and the first resistor when the transistor is set to its off state.

Both switches are embodied as a transistor 125 in parallel with a bypass resistor 126. The bypass resistor 126 will ensure that some minimal electrical current passes through the SMA actuator continuously so that the electrical resistance can continuously be measured. The bypass resistor 126 has a relatively large resistance to provide a minimum current that is far less than the current required for SMA actuation. This base current may be selected to minimize impact on strain output regulation precision. This resistor should have a resistance value of at least about 10 times bigger than the combined resistance value of $R_f$ and $R_{SMA}$.

It will be appreciated that a further branch parallel to both the transistor 125 and bypass resistor 126, featuring a resistor and transistor could be used. For example, if the resistor has an intermediate resistance value (between $R_f$ and that of the bypass resistor 126), it may be used to provide three heating states (both transistors on, or only one or the other on), and one essentially passive state for monitoring. The intermediate resistance may be chosen to provide a minimum heat to the SMA element 10 that can be steadily dissipated without any transition of the SMA element 10 from the completely excited state to a lower excited state. With both transistors on, the sum current flowing will be greater than the first transistor (T1 or T2) alone and this may be used for initial heating to increase a response time, for example if controls are in place to ensure that both transistors are not on when the SMA element is in a state of actuation above a given threshold.

The elements above permit the selective application of heat to the SMA element 10. The state sensor is also provided with electrical taps to the above described circuit. ACH1/4, ACH2/5, ACH3/6 are analogue signal input lines used for measurements of voltages ($V_{11/21}$, $V_{12/22}$, $V_{13/23}$) at the output of the first resistor ($R_F$), at the output of the SMA element 10, and at the input of the respective SMA element 10, respectively. With knowledge of the resistance $R_f$, the resistance across the SMA element 10 ($R_{SMA}$) can be calculated from the following relation: $(V12-V11)/R_f=(V13-V12)/R_{SMA}$.

Each of the tapped signals outputs a voltage, which is detected by a control processor 180, for example via analog voltage modulated interface cards at a computer, such as a data acquisition board. The control processor 180 receives these voltage values for SMA1 and SMA2, and computes for each a current state of actuation therefor. The control processor 180 also issues control signals 201 to the transistors 125 for controlling the closing and opening of the corresponding circuit branches. DCH1 and DCH2 are digital signal channels used to set the transistors 125.

ACH7/8 are used for the signals indicating a measure the force applied to the SMA element 10. For each SMA actuator, there is an integrated stress sensor, consisting of a pair of the foil-type strain gauges 160 (S1a,b and S2a,b), such as shown in FIG. 3b. The stress sensor data is forwarded to a multiplex signal conditioner that may be powered by the DC power source 120, or the computer, depending on specific requirements of the system. The multiplex signal conditioner receives analog data from the individual foil type strain gauges, derives or computes a strain on the SMA element 10, and forwards these values in accordance with a pre-established sampling protocol over a multiplexed channel, to the control processor 180.

Applicant has discovered that change in electrical resistance factored by the loading stress can be precisely correlated to the strain output of SMA so that the precise strain output regulation can be realized. The control processor 180 has either generic or specific knowledge of the SMA elements 10 and their strain output due to the phase transformation as a function of its electrical resistance, as well as the influence of loading stress on the above. Therefore once the electrical SMA resistance value $R_{sma}$ from the formula I given above is calculated, the loading stress readings from the ACH7 or ACH8 can be used to obtain an accurate current strain output of the SMA actuator. If the desired strain output comes from a program running on the computer, or a signal sent to the control processor 180, a comparison of the current strain output with a desired strain output of the SMA actuator may be performed to determine whether in the next interval to keep the transistor on or off. If an analog output is used, or if the control loop is longer than the clock for the DCH channels, it can determine how many of the next intervals to keep the transistor on or off (or more generally in which state of heating if multiple heating states are provided). Various algorithms and lookup tables can be used to determine the control signals 201, as will be appreciated by those of skill in the art.

As will be understood by those of skill in the art, the ACH and DCH channels of FIG. 4a can be collected and sent over a single multiplexed channel saving wiring complexity, and costs. Signaling requirements, protocols and spatial constraints all factor into decisions about how and where to group these signals. It may be preferred to group all of the ACH and DCH channels through a single multiplex signal conditioner, or to have one for each SMA actuator. The circuits of FIGS. 4a,b may be implemented in a circuit board, a gate array, or other structured circuit.

Figure 4B:
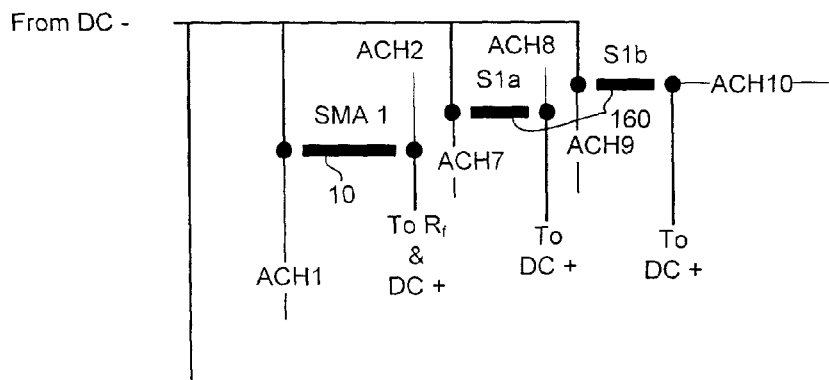
FIG. 4b is a schematic partial illustration of a circuit showing how power supply and signaling of the stress sensors of FIG. 5a can be provided in the same circuit that actuates the SMAs.

FIG. 4b schematically illustrates modifications to the circuit for effecting feedback control of a pair of SMA actuators shown in FIG. 4a to avoid a multiplex signal conditioner. Each voltage regulated output tap is fed directly to the control processor 180, and the circuits are provided from the DC power supply+ to the DC—in a conventional manner.

There are a wide variety of processes that could be used to implement a control program for effecting control feedback for a SMA actuator using the embodiments of this invention. Generally they begin with information relating the force applied to the actuator, the strain output of the actuator, and the state of the actuator. This data may be approximately be represented by piecewise linear graphs as shown in FIG. 1 at incremental loading values, and interpolations of the piecewise linear graphs at loading values intermediate the obtained loading values, or may be represented by an extensive lookup table containing approximate values of strain output for a given range of strain gauge (or other stress sensor readings) and resistance (or other state sensor readings). There are many more sophisticated models and methods for representing the data that could provide anticipated feedback parameters to accelerate the processing for the look up.

A simple control feedback algorithm is now provided, assuming that the internal electrical resistance of the SMA element 10 is used as feedback signal for its strain output regulation, and one or more strain gauges is used (with suitable thermal regulation if required) as the stress sensor. It is assumed that the correlation is known to translate the signals of internal electrical resistance (R) and loading stress (σ) into the strain reading (ε) based. The measured strain output, ε(t), is the function of internal electrical resistance (R) and the loading stress (σ):

$$\epsilon(t)=f(R,\sigma)$$

The strain output (ε(t)), or in general terms, the mechanical response, of a SMA actuator is directly correlated to its temperature, which is mainly determined by heat input (electrical resistive heating through current supply) and environment cooling rates. It can be expressed as:

$$\epsilon(t)=f(C(t),I(t))$$

where, C(t) and I(t) are cooling conditions and electrical current input, respectively. Considering a simple feedback strain output regulation, at any time t, the electrical current input could be designed as:

$$I(t) = I(t-1) + \Delta I(t)$$
$$= I(t-1) + K(t)e(t)$$

where, K(t) is feedback coefficient and e(t) is the error response denoted by $$e(t)=\epsilon^*(t)-\epsilon(t)$$

where ε*(t) and ε(t) are respectively the desired and measured strain output response, respectively. While a variety of control schemes could be useful in different situations, K(t) can be chosen so that the SMA actuator's temperature changes fast and consequently the error response can be reduced quickly.

Considering e(t)>0, the electrical current input should be given a positive increment, and K(t) should also be a positive value. If it is small, the obtained I(t) may not be large enough to heat the SMA element 10 very fast, and many incremental steps would be needed for the SMA element to reach a desired temperature having a desired strain value. So it may be more desirable to have a relatively large value of K(t) so that the desired temperature and thus the strain value can be reached fast, but at the same time the current input should not exceed an upper limit $I_{upper}$, which is set to avoid the overheating of SMA element 10. To have the fastest response, for e(t)>0, current input is thus directly designated as: $I(t)=I_{upper}$. If different upper limits on applied current can be provided for different states of actuation, and different temperatures of the SMA element 10, K could be indexed by these values as well.

For e(t)<0, current input increment should be negative so that SMA wire's temperature may decrease and consequently SMA wire's strain output become smaller. Again to have the fastest response, current input is set as 0.

For e(t)=0, I(t) could be either $I_{upper}$ or 0. So the strain output regulation law can be written as:

$$I(t) = \begin{cases} I_{upper}, & e(t) > 0 \\ 0, & e(t) \leq 0 \end{cases}$$

This regulating law is perfectly suited for the use of transistors. The value of $I_{upper}$ can be determined by experimental tests. It may be chosen to satisfy two conditions: to be large enough to activate full transformation of SMA wire within a desired response time and number of control feedback iterations, and can result in a desired strain output regulation precision.

The estimated ε(t) is compared to the desired strain output to obtain an error response value. If this error response value is greater than zero, the computer sends the signal to the transistor to set it to on. If the error response value is less or equal to zero, the computer sends the signal to the transistor to set it to off.

Naturally with higher accuracy information about the tolerances of the SMA element 10 to heating, and with more options for selectively heating with different current values, other control programs could equally be applied.

Experiments

Figure 5:
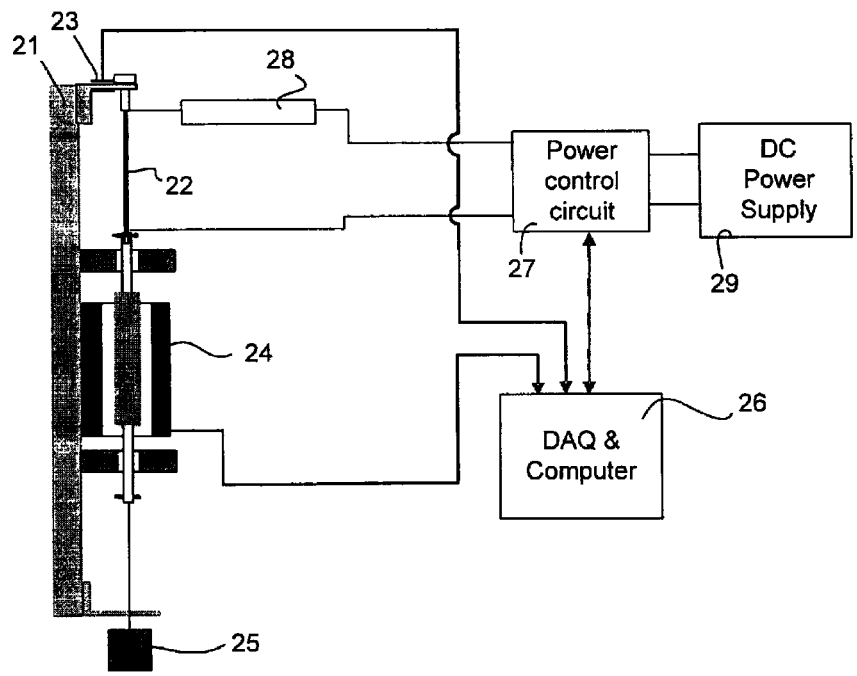
FIG. 5 is a schematic illustration of a test apparatus for determining R-ϵ-σ correlation needed for strain output regulation.

FIG. 5 is a schematic illustration of a test apparatus used to obtain a correlation (R-ϵ-σ) between the strain output, SMA element state, and a force applied to the SMA element, and to demonstrate the present invention. It comprises a rig 21 for suspending a top end of a SMA wire (element) 22, which in the following experiments is a Ni—Ti SMA actuator supplied by Dynalloy Inc. USA. A diameter of the SMA wire is 0.006 inch. The Austenite finishing temperature ($A_f$) is approximately 90° C., and the maximum (recommended) applied force is 330 (g)/3.23 (N). The recommended electrical current input is 400 mA.

The rig 21 suspends the top of the SMA wire 22 from a stress sensor 23 that mirrors the construction of the coupler 107 of FIG. 3b. A linear variable differential transformer (LDVT) 24 coupled to a bottom actuated end of the SMA wire 22 is used to provide very high accuracy displacement measurements to capture the strain output of the device in real time. A load 25 is suspended from the LDVT 24 as shown.

Ambient air was all that was used to cool the SMA wire 22.

The LDVT 24 and stress sensor 23 are connected to a data acquisition board (DAQ) which is coupled to a computer 26 for receiving strain (displacement) information and loading stress information, respectively. These analog signals were sampled at a rate of 100 Hz and digitized. The computer and DAQ 26 are also connected to a power control circuit 27, which consists of a reference resistor 28, transistor, bypass resistor and a DC power supply 29 in an arrangement as shown in FIG. 4a (but only having one SMA actuator). The $R_f$ was 0.4 ohms, and the bypass resistor had a resistance of 120 ohms. The transistor was obtained from DigiKey USA (UC-3705) and was controlled by a standard DC 5 volt signal. The control program provided feedback at a rate of 100 kHz.

Figure 6A:
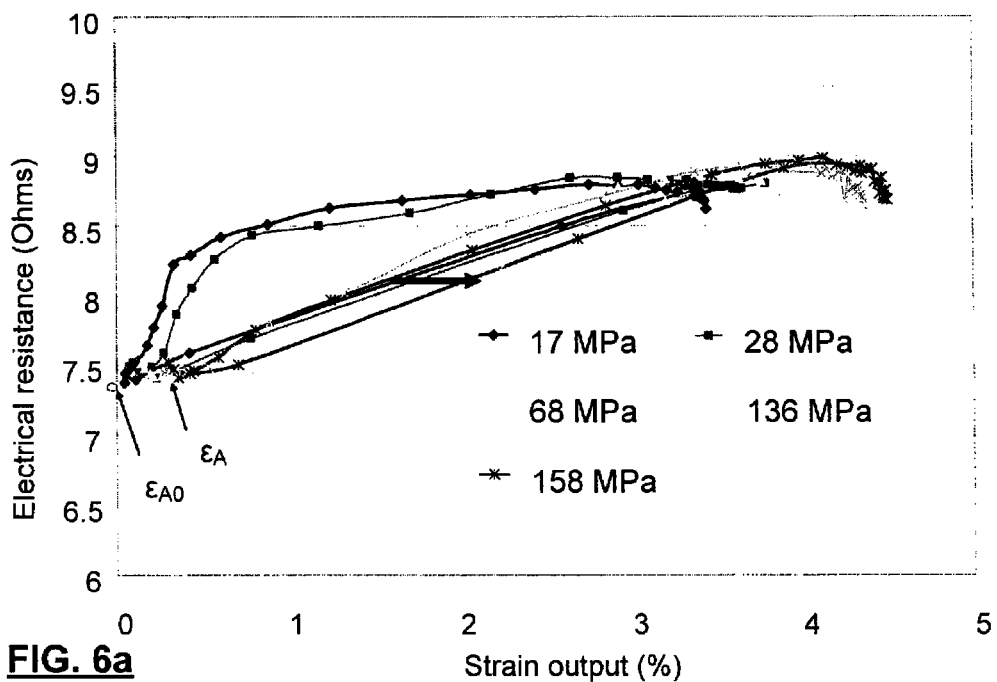
FIG. 6a is a graph relating strain output and electrical resistance of a SMA actuator at various loads.

FIG. 6a graphs resistance across the SMA wire 22 as a function of strain output for a variety of loads. While the characteristic shape of the cycle remains similar with different loads, it is noted that stress causes a change in the workable strain output range, a shift in a reference (x axis) position from $L_{AO}$ (position of SMA actuator when it fully contracted without application of stress) to the $\epsilon_A$ (position fully contracted with the application of stress), as well as a change in the overall C-R correlation. It will be noted that the cooling path is subject to greater hysterisis as the graph is more arcuate and that the lower the load, the greater the hysterisis. It will be noted that the cooling paths are more variable, especially for lower loading values.

Figure 6B:
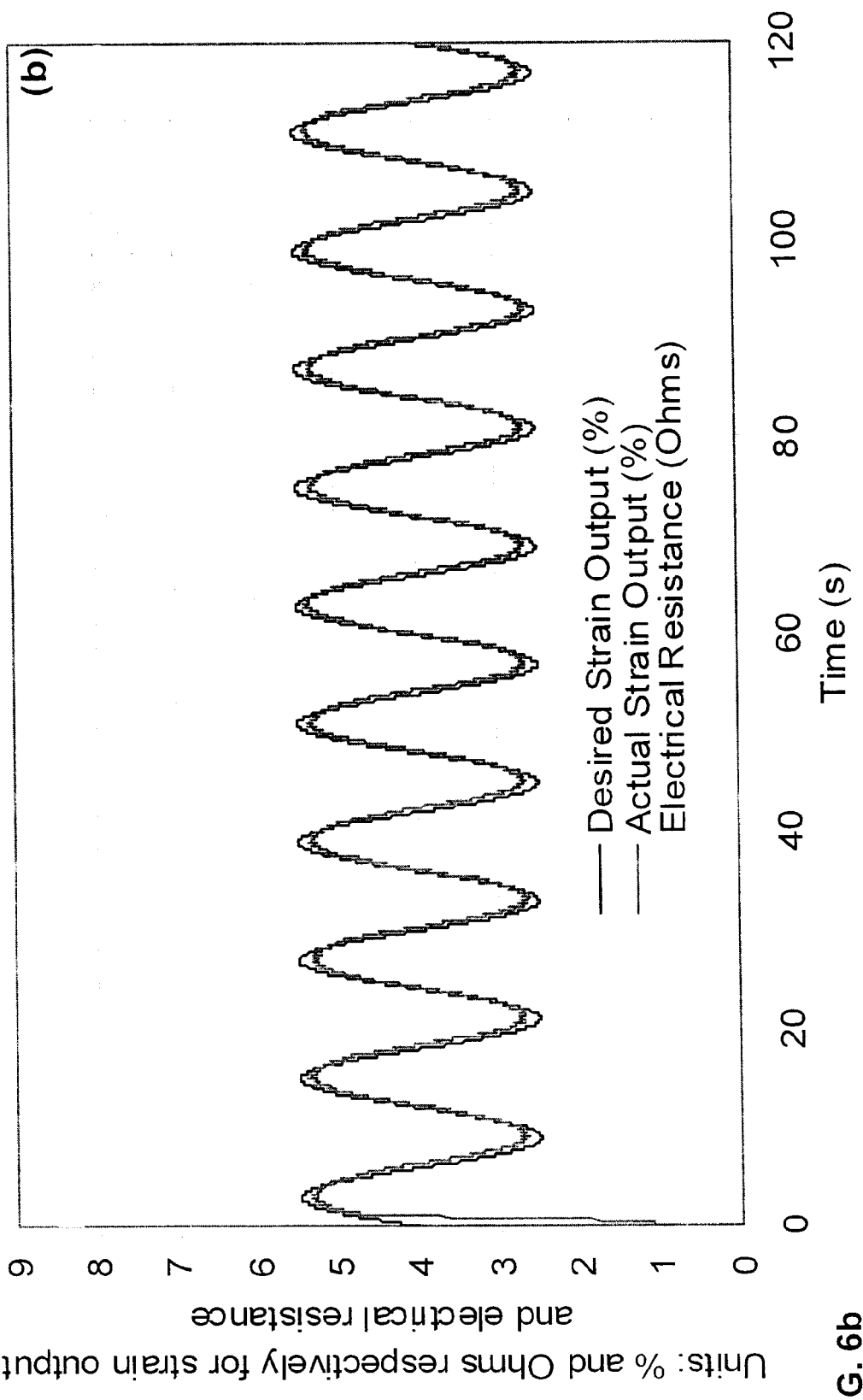
FIG. 6b is a graph showing expected, and observed strain output as a function of time with a plot of resistance for comparison, demonstrating the accuracy with which the resistance and strain gauge feedback control loop operates.

FIG. 6b is a plot showing a high precision strain output of the SMA wire 22 under constant load conditions, using a three dimensional correlation of the stress, state, and strain output that was schematically shown (for only 5 values) in FIG. 6a. The command input was to follow the narrower sinusoidal curve. A very small amount of hysterisis is perceptible, and generally the curve does not quite reach the desired range of positions, but this is a very precise control on a continuously varying command input.

The following algorithm was performed by the computer 26:

When the program is started, presume the strain output of SMA actuator is $\epsilon_o$ at point O ($\epsilon_o$, $R_o$) (the SMA actuator is in the cold state and fully elongated by the stress).

Presume the first targeted strain output is $\epsilon_x$ and stress reading is σ

If $\sigma_{n-1} < \sigma \leq \sigma_n$,
  Then assign $\sigma = \sigma_n$
  A set of corresponding linear functions obtained under loading stress $\sigma_n$ is thus available for estimating the strain from the reading of resistance:

$$\sigma = a_{n\_1} \cdot R + b_{n\_1} \text{ (for heating path)} \quad (1)$$

$$\sigma = a_{n\_2} \cdot R + b_{n\_2} \text{ (for cooling path if } \epsilon_x < \epsilon_{s1}) \quad (2)$$

$$\epsilon = a_{n\_3} \cdot R + b_{n\_3} \text{ (for cooling path if } \epsilon_{s1} < \epsilon_x < \epsilon_{s2}) \quad (3)$$

here $a_{n\_1}$, $a_{n\_2}$, $a_{n\_3}$ and $b_{n\_1}$, $b_{n\_2}$, $b_{n\_3}$ are constants determined by the experiment Because $\epsilon_x < \epsilon_o$, to get the strain output from $\epsilon_o$ to $\epsilon_x$, heating of SMA actuator is required (command is thus sent to turn on the power) and function (1) will is used to estimate the strain output in this case. The estimated ϵ is then fed back into the algorithm (refer to section 3) for strain output regulation procedure to proceed.

Now moving on from here:
  if strain output is required to change from $\epsilon_x$ to $\epsilon_y$,
  because $\epsilon_y > \epsilon_x$
    Cooling is required and command is sent to turn off the power supply to the SMA actuator. Functions for the cooling path are to be considered.
  And because $\epsilon_y$ is in the range between $\epsilon_{s1}$ and $\epsilon_{s2}$
function (2) is selected to estimate the strain output from the resistance reading.

Please note that in the above algorithm description the $\epsilon_0$ value and origin are the fully relaxed state as opposed to the definition used in relation to FIG. 1 in which all strain output values are measured with respect to the $\epsilon_{0A}$ value, which is the completely actuated state.

Figure 6C:
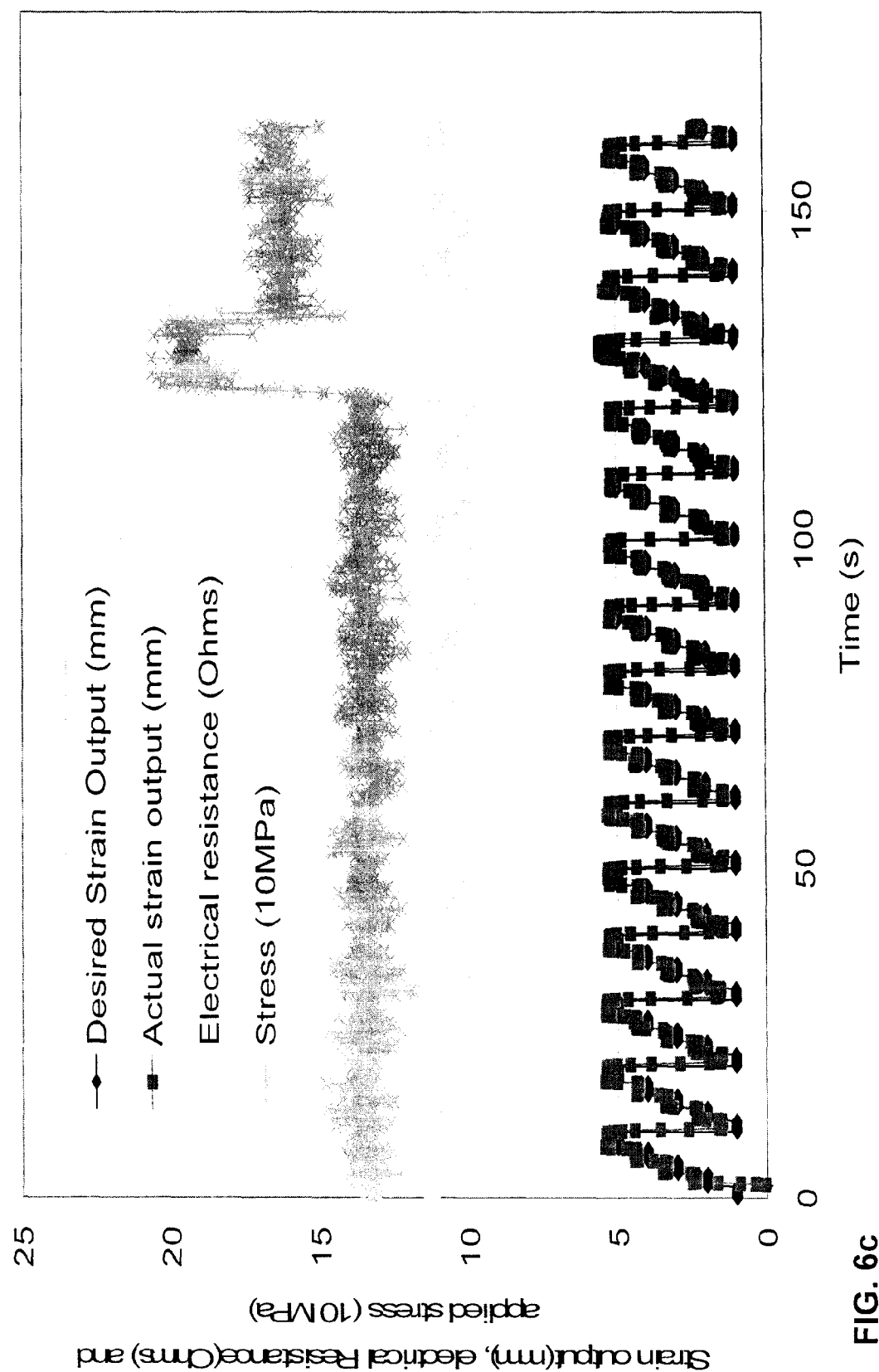
FIG. 6c is a graph showing observed strain output as a function of time, with plots of mechanical resistance and state of actuation for comparison, under an impulse load test.

FIG. 6c is a plot of SMA element 22 strain output as a function of time for a sawtooth waveform control function. Unlike FIG. 6b, a variable load is applied during the test. FIG. 6c shows the desired strain output, measured strain output, resistance values, and strain gauge readings. Effectively a 130 MPa impulse load was applied to the SMA element 22 during the test. Considering the significant load, and its suddenness, a very small deviation from the desired strain output is provided.

It is also noted that the strain gauge readings indicate a fluctuation of about +/−10 MPa even during the steady state before and after the application of the load. The 10 MPa variation results in significant change in the cycle as interpolated from FIG. 6a, especially for low load initial values. Accordingly, the load-factor is expected to have played some role in providing the smooth response shown here.

Figure 7A:
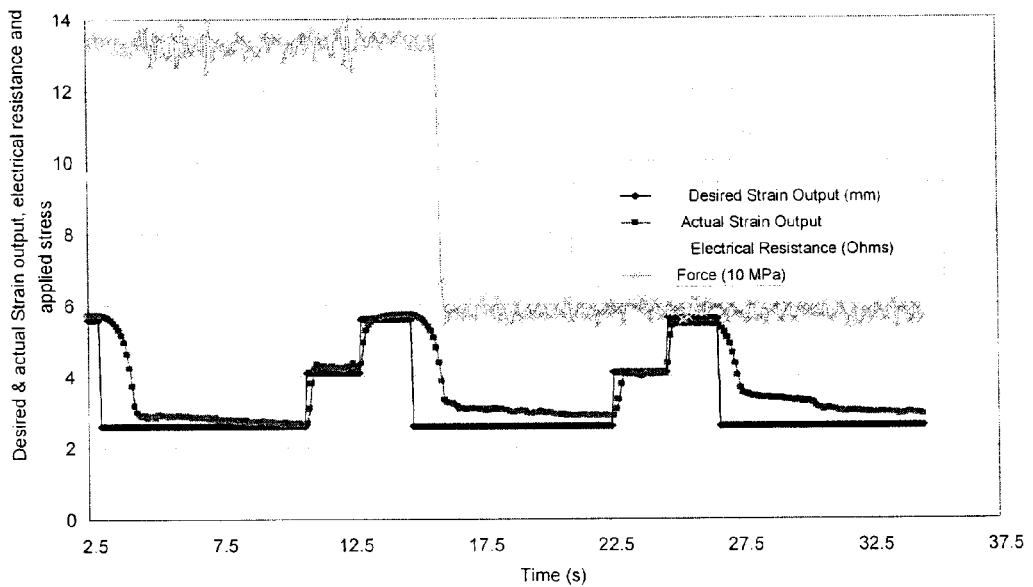
FIGS. 7a,b, and 8a,b are graphs showing comparative precision of feedback control with and without force feedback loops.
Figure 7B:
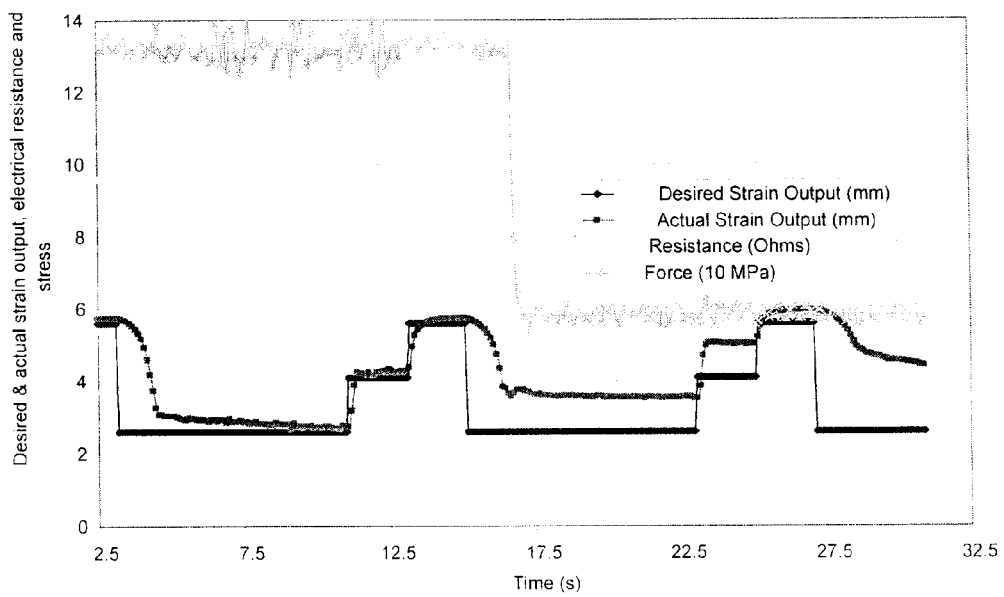
Figure 8A:
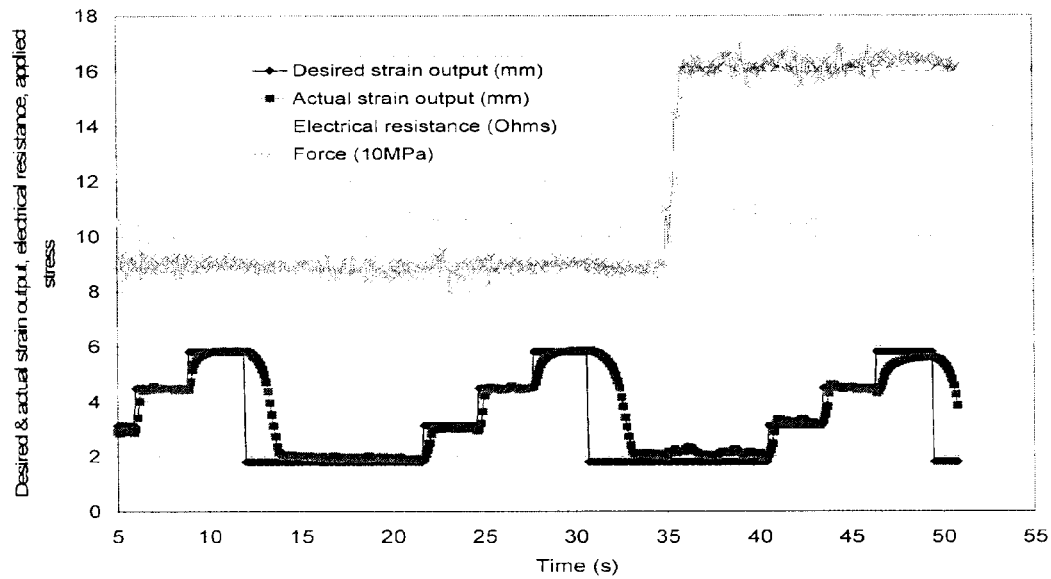
Figure 8B:
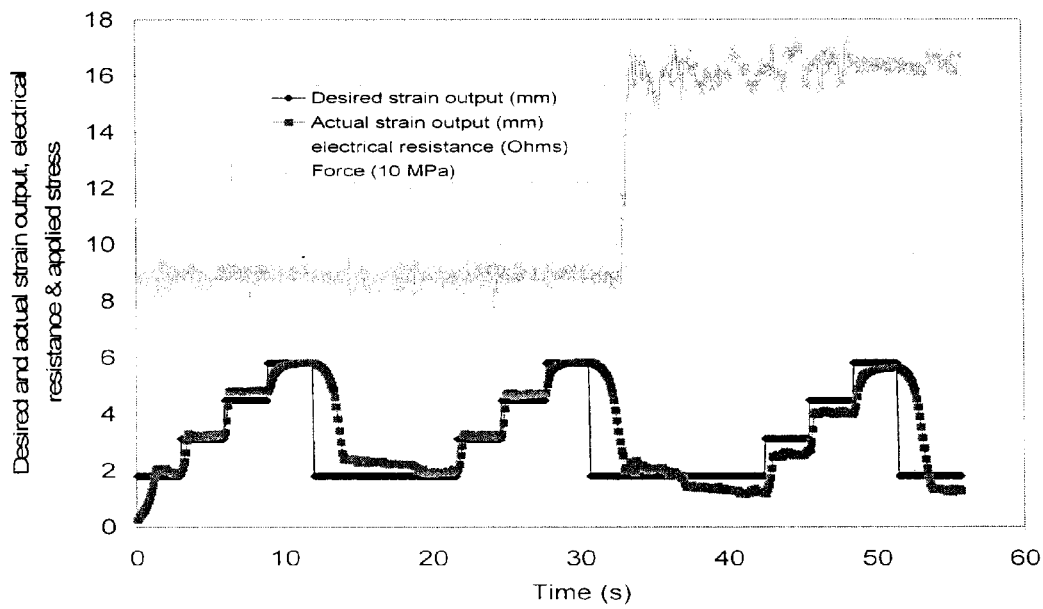

FIGS. 7a,b and FIGS. 8a,b are plots providing comparative examples of the quality of the feedback control loop with and with out load factoring. In FIGS. 7a,b the SMA wire 22 is subjected to a two step periodic function. During a first rise, a ~70 MPa load is abruptly removed. It is noted that the hysterisis precludes a fast drop in strain output, unlike the fast rise in strain output applied by direct electric resistance heating. Otherwise the strain output conforms with that of the two step periodic function relatively well. In comparison, the large scale changes in applied load severely impact the approximation.

FIGS. 8a,b are plots showing data output from the strain gauges, LVDT, and resistance circuit given a prescribed command function to produce a 3 step periodic function. In this example, a short time after the return to base a ~70 MPa force is suddenly applied. It is again noted that except for the delayed response for cooling, the strain output of the SMA wire 22 is very close to the desired function, and is more accurate than the response function in every section of the graph. The response appears to be better both in response to variation of the load before, after and during the impulse test.

While the foregoing examples were designed to control a strain output of the SMA actuator, it will be appreciated that in other examples, it would be desired to control a force output of the SMA actuator. For example, in robotics it may be desirable to lift an object which requires applying a pre-established force, regardless of a changing environment and/or load on the actuator. Furthermore, combined control schemes may be desired. For example, a reading from the strain guage could also be used to protect the SMA element from overloading of mechanical stress, for example by overriding instructions if the strain gauge readings applied equals or exceeds a maximum allowable stress.

While the foregoing examples showed little hysterisis, especially heating path, control feedback algorithms that take into account a limited history of the SMA actuator may more accurately determine an actual strain output of the SMA actuator, and an amount of current needed to effect a desired change from the previous state of, and force on, the SMA actuator.

The proposed method and feedback control mechanism provides one solution for controlling feedback of a SMA element that is simple and robust, and has minimal power requirements, thus eliminating important constraints on the design and operation of SMA actuators. A single control processor based on this method is capable to regulate the strain outputs of multiple SMA actuators simultaneously.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A control feedback mechanism for regulating strain output of a shape memory alloy (SMA) actuator comprising:
    a stress sensor for outputting an indication of a force to a control processor, the stress sensor being a strain gauge for computing a load on an SMA element of the SMA actuator;
    a state sensor for outputting an indication of an amount of Austenitic phase of the SMA element relative to Martensitic phase, the state sensor comprising circuit elements for outputting a signal corresponding to an electrical resistance across the SMA element to the control processor;
    the control processor for computing an actuation signal for selectively heating the SMA element in dependence on physical characteristics of the SMA element, a desired strain output value of the SMA actuator, and the indications of force and amount of Austenitic phase; and
    a circuit for delivering the actuation signal as an electrical signal to selectively deliver power from a power source for direct electrical resistive heating of the SMA element;
    wherein the state sensor outputs the indication of amount of Austenitic phase to the control processor, regardless of whether the SMA actuator is actuated, by supplying a current to the SMA element that is less than a current required for SMA actuation, when the SMA element is not being heated.

2. The control feedback mechanism of claim 1 wherein selectively heating the SMA element is performed exclusively by direct application of current through the SMA element via the circuit.

3. The control feedback mechanism of claim 2 wherein the SMA actuator is of a contraction-type, and the SMA element is in the form of a wire, ribbon, rod, strip or tube, or an assembly of one or more of the above, the SMA element being made of a Ni—Ti or Ni—Ti—Cu alloy.

4. The control feedback mechanism of claim 3 wherein the circuit comprises a first resistor connected in series with the SMA element, and a switch for selectively closing the circuit in response to a signal from the control processor to apply a controlled current through the SMA element.

5. The control feedback mechanism of claim 3 wherein the circuit comprises a first resistor connected in series with the SMA element, and a switch for selectively closing the circuit in response to the actuation signal from the control processor so that a predefined threshold power is applied to the SMA element.

6. The control feedback mechanism of claim 5 wherein the switch is a first transistor, and the circuit further comprises a bypass resistor connected in parallel to the first transistor and in series with the first resistor forming a first circuit branching between the first resistor and the first transistor, the bypass resistor being of a resistance selected to bypass the first transistor when the transistor is off while providing sufficient electrical power to allow an electrical resistance measurement of the SMA element, while applying a minimum current that is far less than the current required for actuation of the SMA element.

7. The control feedback mechanism of claim 6 wherein the control processor is adapted to compute the resistance across the SMA element ($R_{sma}$) using the formula: $R_{sma}=R_f(V_{13}-V_{12})/(V_{12}-V_{11})$, where $R_f$ is the first resistor, $V_{11}$ is a voltage tap between the first resistor and the first circuit branching to the bypass resistor, $V_{12}$ is a voltage tap between the SMA element and the first resistor, and $V_{13}$ is a voltage tap between a power supply and the SMA element.

8. The control feedback mechanism of claim 6 further comprising a second circuit branching between the first resistor and the first transistor including in series a second bypass resistor and a second transistor, the second bypass resistor being of a resistance selected to apply a second electrical power to the SMA element, the second electrical power sufficient to maintain the SMA actuator in an actuated state, in response to the actuation signal from the control processor.

9. The control feedback mechanism of claim 3 wherein the control processor is adapted to determine the actuation signal in dependence on:
    the physical characteristics of the SMA element, the desired strain output value, and the indications of force and amount of Austenitic phase, and one or more of:
    a hysteresis function that depends on previously sent actuation signals;
    a modeled thermodynamic state of the SMA element environment;
    a measurement of a thermodynamic state of the SMA element environment; and
    an operating mode of the SMA actuator.

10. The control feedback mechanism of claim 1 wherein the state sensor comprises circuit elements including some of the circuit, for outputting an electrical resistance across the SMA element to the control processor.

11. The control feedback mechanism of claim 1, wherein the power source is a direct current (DC) power source.

12. The control feedback mechanism of claim 1 wherein reading from the strain gauge is also used to protect the SMA element from overloading of mechanical stress.

13. The control feedback mechanism of claim 1 wherein the strain gauge is located proximate a support for retaining one end of the SMA element.

14. The control feedback mechanism of claim 1 wherein the strain gauge is supplied power from the power source.

15. The control feedback mechanism of claim 1 wherein the strain gauge operates on the principle of electrical resistance varying with cross-section and length of a conductor.

16. The control feedback mechanism of claim 15 wherein:
the strain gauge is thermally isolated from the SMA element;
the strain gauge comprises a thermocouple for determining a temperature of the strain gauge, so that the force indication includes one of: a value resulting from readings of the strain gauge and the thermocouple; or both the readings of the strain gauge and the thermocouple;
the strain gauge comprises two or more strain gauges arranged so that variation in response to a given change in temperature can be isolated and removed; or
the strain gauge comprises two or more strain gauges arranged for elongation and compression respectively in response to stress applied on the SMA element.

17. A method of controlling a shape memory alloy (SMA) actuator, the method comprising:
receiving signals of internal electrical resistance of an SMA element and loading stress on the SMA element, as feedback for strain output regulation of the SMA actuator, the internal electrical resistance indicating an amount of Austenitic phase of the SMA element relative to Martensitic phase, and the loading stress output by a strain gauge located proximate a support for retaining one end of the SMA element;
translating the signals of internal electrical resistance and loading stress into a strain output reading based on a pre-established correlation at a control processor; and
using the strain output reading as a feedback signal to regulate the strain output of the SMA actuator by delivering an actuation signal as an electrical signal to selectively deliver power for direct electrical resistive heating of the SMA element in dependence upon the strain output reading,
wherein receiving the signal of electrical resistance is provided, regardless of whether the SMA actuator is actuated, by continuously supplying a current to the SMA element that is less than a current required for SMA actuation, when the direct electrical resistive heating is not applied.

18. The method of claim 17 wherein translating the signals and using the strain output reading involves computing the actuation signal in dependence on:
the physical characteristics of the SMA element, the desired strain output value, and the indications of force and amount of Austenitic phase, and one or more of:
a hysteresis function that depends on previously sent actuation signals;
a modeled thermodynamic state of the SMA element environment;
a measurement of a thermodynamic state of the SMA element environment; and
an operating mode of the SMA actuator.

19. The method of claim 17 wherein the SMA actuator is of a contraction-type, and comprises a SMA element in the form of a wire, ribbon, rod, strip or tube, or an assembly of one or more of the above, the SMA element being made of a Ni—Ti or Ni—Ti—Cu alloy.

20. The method of claim 17 wherein regulating the strain output of the SMA actuator is performed exclusively by the direct electrical resistive heating of the SMA element.

* * * * *